(12) United States Patent
Booz et al.

(10) Patent No.: US 7,788,529 B2
(45) Date of Patent: Aug. 31, 2010

(54) METHOD FOR SAFELY INTERRUPTING BLOCKED WORK IN A SERVER

(75) Inventors: David Booz, Rhinebeck, NY (US);
David Follis, Hyde Park, NY (US);
Gary Puchkoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 11/296,986

(22) Filed: Dec. 8, 2005

(65) Prior Publication Data

US 2007/0240015 A1    Oct. 11, 2007

(51) Int. Cl.
*G06F 11/00* (2006.01)
(52) U.S. Cl. ............................................. 714/9; 714/11
(58) Field of Classification Search ...................... 714/9, 714/11
See application file for complete search history.

(56) References Cited

U.S. PATENT DOCUMENTS

| 5,305,455 | A | 4/1994 | Anschuetz et al. | 395/700 |
| 6,301,676 | B1* | 10/2001 | Kumar et al. | 714/11 |
| 6,738,974 | B1 | 5/2004 | Nageswaran et al. | 719/104 |
| 2003/0018681 | A1 | 1/2003 | Subramanian et al. | 709/102 |
| 2005/0066332 | A1 | 3/2005 | Durai | 718/108 |

* cited by examiner

*Primary Examiner*—Scott T Baderman
*Assistant Examiner*—Jigar Patel
(74) *Attorney, Agent, or Firm*—Cantor Colburn LLP; Gerry Monteleone

(57) ABSTRACT

A method for safely interrupting blocked work in a server including: creating a registry; registering a potential blocking event in the registry; executing the potential blocking event; determining that the potential blocking event is not responding; accessing a registry entry corresponding to the blocking event; and taking an corrective action indicated by the registry entry corresponding to the blocking event.

15 Claims, 2 Drawing Sheets

METHOD FOR SAFELY INTERRUPTING BLOCKED WORK IN A SERVER

BACKGROUND

The present disclosure relates to processing in a computer system; more specifically the present disclosure relates to a method for safely interrupting blocked work in a server.

Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computers have increased, the application programs designed for high performance computer systems have become extremely powerful.

Depending on the allocation of shared system resources among different processes, conflicts in resource utilization can occur. Since many different processes can be processing simultaneously, it is entirely possible that two or more of the processes may need access to a given shared system resource at the same time. However, if a given processes has acquired a resource for use and that processes is terminated unexpectedly for any reason, the acquired resource may become unavailable for other processes, leading to inefficiencies in the processing environment.

For example, a given process running on a thread may be using a shared system resource such as a mutex object. A mutex object is an object that locks a piece of data such that only one thread can control that piece of data at any time. It is a shared system resource because many threads may wish to access the mutex object to get to the piece of data. If the thread is terminated abruptly, such that the thread does not have an opportunity to quiesce its state, the shared mutex object may be "locked-out" and other threads associated with other processes may be unable to access the mutex object, and its concomitant data, for use. This situation may require a complete shutdown of one or more processes to allow the shared resource to be "released" so that the shared resource can be made available for other processes. In another scenario, a process may be "looping" for an extended period of time, using a shared system resource, and thereby preventing other system processes from accessing the shared system resource. In some cases, it may even become necessary to restart the entire system to allow the shared resource to become available for processing again.

Such blocked work can prevent the server from processing other requests and perhaps eventually completely seize up if all dispatch threads become blocked. The current solution in use to this problem is to wait a specified amount of time for a request to complete and if it does not complete within that time to terminate the server process. This has the unfortunate side effect of also terminating any other requests being dispatched in the application server.

Therefore, what is needed is a shared system resource allocation and management mechanism for effectively allocating and controlling shared system resources.

SUMMARY

Exemplary embodiments include a method for safely interrupting blocked work in a server including: creating a registry; registering a potential blocking event in the registry; executing the potential blocking event; determining that the potential blocking event is not responding; accessing a registry entry corresponding to the blocking event; and taking an corrective action indicated by the registry entry corresponding to the blocking event.

Exemplary embodiments also include a system for safely interrupting blocked work in a server including: means for creating a registry; means for registering a potential blocking event in the registry; means for executing the potential blocking event; means for determining that the potential blocking event is not responding; means for accessing a registry entry corresponding to the potential blocking event; and means for taking an corrective action indicated by the registry entry corresponding to the potential blocking event.

Exemplary embodiments further include a storage medium encoded with machine-readable computer program code for syntactically parsing a buffer, the storage medium including instructions for safely interrupting blocked work in a server including: creating a registry; registering a potential blocking event in the registry; executing the potential blocking event; determining that the potential blocking event is not responding; accessing a registry entry corresponding to the potential blocking event; and taking an corrective action indicated by the registry entry corresponding to the potential blocking event.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Referring to the exemplary drawings wherein like elements are numbered alike in the several Figures.

DETAILED DESCRIPTION

Disclosed herein is a method for safely interrupting blocked work in a server. The method for safely interrupting blocked work in a server generally includes: creating a registry; registering a potential blocking event in the registry; executing the potential blocking event; determining that the potential blocking event is not responding; accessing a registry entry corresponding to the blocking event; and taking an corrective action indicated by the registry entry corresponding to the blocking event.

Figure 1:
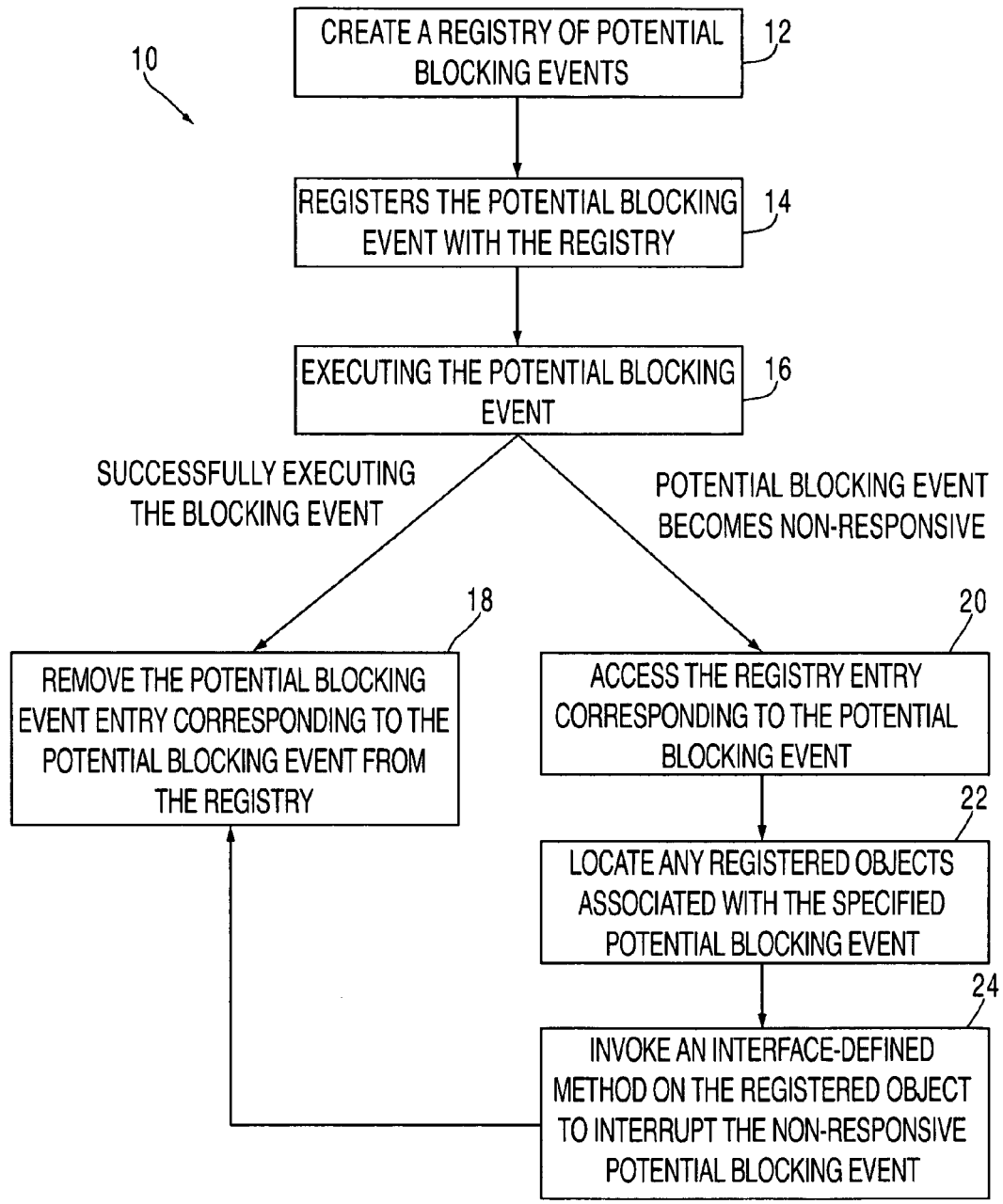
FIG. 1 illustrates a flow chart of a method for safely interrupting blocked work in a server in accordance with exemplary embodiments.

Referring now to FIG. 1, a flow chart of a method for safely interrupting blocked work in a server in accordance with exemplary embodiments is generally depicted as 10. The first step in the method for safely interrupting blocked work in a server, is to create a registry of potential blocking events as shown at process block 12. The registry will be discussed in further detail herein with reference to FIG. 2. As shown at process block 14 the method for safely interrupting blocked work in a server registers the potential blocking event with the registry, prior to executing the potential blocking event, or section of code, which is depicted at process block 16. Depending on whether or not the potential blocking event executes successfully or becomes non-responsive, the method for safely interrupting blocked work in a server will proceed to process block 18 or 20 respectively. The method for safely interrupting blocked work in a server may use several techniques to determine in the potential blocking event has become non-responsive including, but not limited to, the use of a timer or monitoring activity preformed by the potential blocking event.

After successfully executing the blocking event, the method for safely interrupting blocked work in a server removes the potential blocking event entry corresponding to the potential blocking event from the registry, as shown at process block 18. However, if the potential blocking event becomes non-responsive, the method for safely interrupting blocked work in a server accesses the registry entry corresponding to the potential blocking event, as shown at process block 20. Any information required to assist in unblocking the potential blocking event can be placed in instance data in the object placed in the registry. In an exemplary embodiment, the registry may contain an interface to be implemented corresponding to each potential blocking event. Additionally, the registry can also maintain a correlation between the registered object, or potential blocking event, and the process from which it was registered, i.e. the thread where the application request is being dispatched. When the method for safely interrupting blocked work in a server determines, for whatever reason, that the potential blocking event may be not responding, then the method for safely interrupting blocked work in a server invokes a method referenced on the registry entry corresponding to the potential blocking event to be interrupted.

Continuing with FIG. 1, after accessing the registry entry corresponding to the potential blocking event, the registry locates any registered objects associated with the specified potential blocking event, as shown at process block 22. If any exist, the method for safely interrupting blocked work in a server then invokes an interface-defined method on the registered object to interrupt the non-responsive potential blocking event, as shown at process block 24. The interface-defined method is responsible for locating whatever control structures are necessary to either activate the non-responsive potential blocking event or terminate the non-responsive blocking event. In exemplary embodiments, the potential blocking event is interrupted in such a way that the potential blocking event recognizes that it was interrupted and can take whatever action is appropriate to indicate a failure. After interrupting the non-responsive potential blocking event and invoking the interface-defined method, the method for safely interrupting blocked work in a server removes the potential blocking event entry corresponding to the potential blocking event from the registry, as shown at process block 18.

Figure 2:
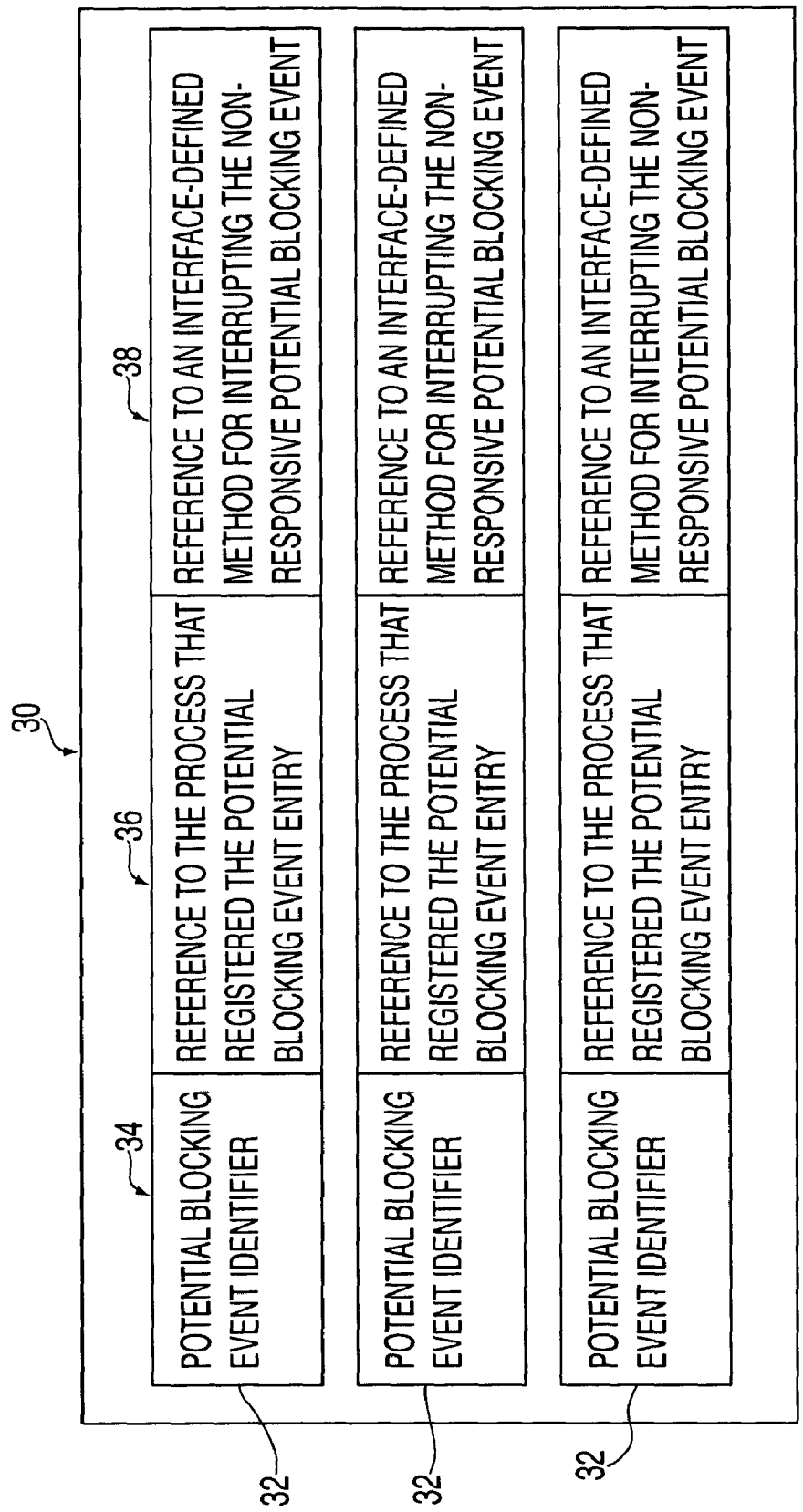
FIG. 2 illustrates a block diagram of a registry in accordance with exemplary embodiments.

Turning now to FIG. 2, a block diagram of a registry of potential blocking events is depicted generally as 30. The registry of potential blocking 30 includes a plurality of potential blocking event entries 32. Each potential blocking event entry 32 can include a potential blocking event identifier 34, a reference to the process that registered the potential blocking event entry 36, and a reference to an interface-defined method for interrupting the non-responsive potential blocking event 38. The potential blocking event identifier 34 can include a memory address, name, or other unique piece of identifying information used to identify the potential blocking event. Likewise, the reference to the process that registered the potential blocking event entry 32 can include a memory address, name, or other unique piece of identifying information used to identify the process that registered the potential blocking event entry 32. Additionally, the reference to an interface-defined method for interrupting the non-responsive potential blocking event can include a memory address, name, or other reference that may be used to refer to the interface-defined method for interrupting the non-responsive potential blocking event.

In a particular exemplary embodiment, the potential blocking event may be an application that reserves a resource. For example, the application could be a network communications application which may open a socket and send a message to a remote server and then waits, utilizing a read( ) function, for a response from the remote server. In this example, prior to opening a socket, the application would register an interface implementation with the registry. If the system determines that the application needs to be interrupted the interrupt method would be driven on the registered object. When the interrupt method is driven on the registered object, it could set a flag and close the socket. The application would get woken up from its read( ) with a failure because the socket was closed and would check that the flag was set and report that it was told to stop waiting for a response. In this case, if the flag was not set indicating that the application was interrupted by the interrupt method the application would report a communications failure. In alternative exemplary embodiments, connectors to backend databases or other infrastructure code may preform the registering and providing the interrupt processing rather than the application.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for safely interrupting blocked work in a server comprising:
   creating a registry;
   registering a potential blocking event in the registry;
   executing the potential blocking event;
   determining that the potential blocking event is not responding;
   accessing a registry entry corresponding to the potential blocking event, the registry entry including a reference to the process that registered the potential blocking event and a reference to an interface-defined method for interrupting the potential blocking event, the interface-defined method responsible for locating control structures to activate the potential blocking event; and
   taking a corrective action indicated by the registry entry corresponding to the potential blocking event, the corrective action corresponding to the interface-defined method for interrupting the potential blocking event, the potential blocking event being interrupted so that the potential blocking event recognizes that it was interrupted and takes action appropriate to indicate a failure.

2. The method of claim 1 further comprising removing the potential blocking event from the registry.

3. The method of claim 1 wherein a timer is used to determine that the potential blocking event is not responding.

4. The method of claim 1, wherein the corrective action includes releasing one or more system resource reserved by the potential blocking event.

5. The method of claim 1, the registry entry comprises a blocking event identifier and a reference to the process that registered the potential blocking event entry.

6. A system for safely interrupting blocked work in a server comprising:
   means for creating a registry;
   means for registering a potential blocking event in the registry;
   means for executing the potential blocking event;
   means for determining that the potential blocking event is not responding;
   means for accessing a registry entry corresponding to the potential blocking event, the registry entry including a reference to the process that registered the potential blocking event and a reference to an interface-defined method for interrupting the potential blocking event, the interface-defined method responsible for locating control structures to activate the potential blocking event; and
   means for taking a corrective action indicated by the registry entry corresponding to the potential blocking event, the corrective action corresponding to the interface-defined method for interrupting the potential blocking event, the potential blocking event being interrupted so that the potential blocking event recognizes that it was interrupted and takes action appropriate to indicate a failure.

7. The system of claim 6 further comprising removing the potential blocking event from the registry.

8. The system of claim 6 wherein a timer is used to determine that the potential blocking event is not responding.

9. The system of claim 6, wherein the corrective action includes releasing one or more system resource reserved by the potential blocking event.

10. The system of claim 6, the registry entry comprises a blocking event identifier and a reference to the process that registered the potential blocking event entry.

11. A storage medium encoded with machine-readable computer program code for syntactically parsing a buffer, the storage medium including instructions for safely interrupting blocked work in a server comprising:
    creating a registry;
    registering a potential blocking event in the registry;
    executing the potential blocking event;
    determining that the potential blocking event is not responding;
    accessing a registry entry corresponding to the potential blocking event, the registry entry including a reference to the process that registered the potential blocking event and a reference to an interface-defined method for interrupting the potential blocking event, the interface-defined method responsible for locating control structures to activate the potential blocking event; and
    taking an corrective action indicated by the registry entry corresponding to the potential blocking event, the corrective action corresponding to the interface-defined method for interrupting the potential blocking event, the potential blocking event being interrupted so that the potential blocking event recognizes that it was interrupted and takes action appropriate to indicate a failure.

12. The storage medium of claim 11 further comprising removing the potential blocking event from the registry.

13. The storage medium of claim 11 wherein a timer is used to determine that the potential blocking event is not responding.

14. The storage medium of claim 11, wherein the corrective action includes releasing one or more system resource reserved by the potential blocking event.

15. The storage medium of claim 11, the registry entry comprises a blocking event identifier and a reference to the process that registered the potential blocking event entry.

* * * * *